United States Patent [19]
Tawara et al.

[11] Patent Number: 5,643,650
[45] Date of Patent: Jul. 1, 1997

[54] MAGNETO-OPTICAL RECORDING MEDIUM

[75] Inventors: Yoshio Tawara, Tokyo; Katsushi Tokunaga; Hideo Kaneko, both of Kanagawa-ken; Yoshiaki Shimizu, Gunma-ken, all of Japan

[73] Assignee: Shin-Etsu Chemical Co., Ltd., Tokyo, Japan

[21] Appl. No.: 496,256

[22] Filed: Jun. 28, 1995

Related U.S. Application Data

[63] Continuation of Ser. No. 188,651, Jan. 28, 1994, abandoned, which is a continuation of Ser. No. 935,822, Aug. 26, 1992, abandoned.

[30] Foreign Application Priority Data

Sep. 9, 1991 [JP] Japan ................................. 3-256964

[51] Int. Cl.$^6$ ....................................................... G11B 5/66
[52] U.S. Cl. ........................ 428/64.3; 428/694 RL; 428/694 ML; 428/900; 369/13; 365/122; 360/122
[58] Field of Search ................ 428/694 RL, 694 ML, 428/900, 64.3; 369/13; 365/122; 360/122

[56] References Cited

U.S. PATENT DOCUMENTS 4,839,226  6/1989  Sawada et al. ........................ 428/336

FOREIGN PATENT DOCUMENTS

| 0368194 | 10/1983 | European Pat. Off. . |
| 296888 | 12/1988 | European Pat. Off. . |
| 0317982 | 5/1990 | European Pat. Off. . |
| 0406569 | 9/1991 | European Pat. Off. . |
| 213849 | 8/1989 | Japan . |
| 27943 | 11/1989 | Japan . |
| 292753 | 2/1991 | Japan . |

OTHER PUBLICATIONS

Patent Abstracts of Japan, vol. 15, No. 55 (P–1164) 8 Feb. 1991 & JP–A–22 85 533 (Teijin Ltd) 22 Nov. 1990.

Patent Abstracts of Japan, vol. 12, No. 123 (P–690) 16 Apr. 1988 & JP–A–62 246 160 (Oki Electric Industry Co., Ltd.) 27 Oct. 1987.

*Primary Examiner*—Leszek Kiliman
*Attorney, Agent, or Firm*—McAulay Fisher Nissen Goldberg & Kiel, LLP

[57] ABSTRACT

The recording sensitivity can be improved of a magneto-optical recording medium having a laminar structure consisting of a first dielectric layer, a recording layer, a second dielectric layer and reflecting layer successively formed on a transparent substrate plate by forming the reflecting layer from an alloy consisting of aluminum and from 0.05 to 3 atomic % of a rare earth element such as neodymium and gadolinium in place of pure aluminum as in conventional magneto-optical recording media.

2 Claims, 8 Drawing Sheets

MAGNETO-OPTICAL RECORDING MEDIUM

This is a continuation of application Ser. No. 08/188,651, filed Jan. 28, 1994, which, in turn, is a continuation of application Ser. No. 07/935,822, filed Aug. 26, 1992, both now abandoned.

BACKGROUND OF THE INVENTION

The present invention relates to an improvement in a magneto-optical recording medium or, more particularly, to an improvement for greatly increasing the recording sensitivity of a magneto-optical recording medium.

Along with the rapid progress of the information-predominant society, electronic information recording media for storage of information are required to have more and more increased recording density and larger and larger capacity for information storage. In this regard, magneto-optical recording media are highlighted in respect of the rewritability of information and replaceability of one medium with another so that extensive and intensive investigations are now under way to improve the performance of magneto-optical recording media in several aspects.

Magneto-optical recording media in general have a laminar structure with a transparent substrate plate and layers successively formed thereon including a magnetic recording layer and a metallic reflecting layer with, optionally but in most cases, layers of an inorganic dielectric material intervening, one, between the substrate plate and the magnetic recording layer and, the other, between the magnetic recording layer and the metallic reflecting layer.

The magnetic recording layer in the magneto-optical recording media under current use is mostly formed from an alloy of transition metals including at least one kind of the rare earth elements such as an alloy of terbium, iron and cobalt. A problem in such a recording layer of a rare earth-based alloy is that, since the Kerr rotation angle of such a recording layer is relatively small, the C/N ratio in the reading-out of the recorded signals cannot be high enough because the C/N ratio is proportional to the product of the Kerr rotation angle and the square root of the reflectivity. It is known that the Kerr rotation angle can be increased by providing an interference layer or a reflecting layer so that a typical magneto-optical recording medium has a laminar structure consisting of a transparent substrate plate, a first dielectric layer, a magnetic recording layer, a second dielectric layer and a metallic reflecting layer as is mentioned above.

Needless to say, the properties of the reflecting layer has a great influence on the performance of the magneto-optical recording medium. In a magneto-optical recording medium having a structure in which the second dielectric layer in the above mentioned typical one is omitted, for example, the angle of optical rotation can be increased by utilizing the Faraday rotation occurring when the light transmitting through the recording layer and reflected on the reflecting layer again transmits the recording layer. In a typical magneto-optical recording medium having the second dielectric layer, the angle of optical rotation in read-out can be further increased by the multiple reflection on the second dielectric layer so as to increase the C/N ratio in read-out. A requirement for the reflecting layer is that the reflectivity thereof should be as high as possible as is self-explanatory. Besides, the reflecting layer is required to have a thermal conductivity as small as possible. The reason therefor is that, since recording by the incident light to the recording layer takes place when the temperature of the layer is increased approaching the Curie temperature or the compensation temperature by the energy of light absorbed by the layer, a larger thermal conductivity results in retardation of the temperature increase of the layer by the accumulation of heat as a consequence of an increase in the thermal diffusion.

A typical and most conventional metallic material of the reflecting layer is aluminum which exhibits, when it is pure aluminum, a reflectivity of as high as about 86% at a wavelength of around 800 nm which is the wavelength of the laser beams emitted from a semiconductor laser widely used in magneto-optical disc drives. The advantage of a reflecting layer of aluminum with such a high reflectivity is partly cancelled by the large thermal conductivity of aluminum which is as large as 150 W/m·K or larger resulting in an insufficient recording sensitivity, which is still lower when the velocity of the disc drive is increased and consequently the linear velocity of the light beam is increased resulting in a decrease of the applied energy to the recording layer per unit area per unit time.

A proposal is made in Japanese Patent Kokai 1-264649 according to which the reflecting layer of a magneto-optical recording medium is formed from palladium or platinum which is a metal having a small thermal conductivity of each about 70 W/m·K. These metals, however, are defective in respect of the low reflectivity of light which is about 60 to 70% so that the C/N ratio in reading-out of a magneto-optical recording medium cannot be large enough.

SUMMARY OF THE INVENTION

The present invention accordingly has an object to provide an improvement in relation to the material of the reflecting layer in a magneto-optical recording medium to be freed from the above described problems and disadvantages in the conventional metallic materials used for the purpose.

Thus, the improvement provided by the present invention comprises, in a magneto-optical recording medium having a laminar structure comprising a transparent substrate plate, a magnetic recording layer, a metallic reflecting layer and, optionally a first and a second dielectric layers intervening between the substrate plate and the recording layer and between the recording layer and the reflecting layer, respectively, having the reflecting layer formed from an alloy consisting of aluminum and a metal of a rare earth element.

The rare earth element is preferably selected from the group consisting of yttrium, neodymium and gadolinium or, more preferably, is neodymium or gadolinium and the content of the rare earth element in the binary alloy with aluminum is in the range from 0.05 to 10 atomic % or, preferably, from 0.05 to 3 atomic %.

DETAILED DESCRIPTION OF THE PREFERRED EMBODIMENTS

As is described above, the most characteristic feature of the invention consists in the chemical composition of the metallic material forming the reflecting layer. Namely, the reflecting layer is formed from an alloy of aluminum and a rare earth element. The rare earth element here implied includes yttrium and the elements having an atomic number in the range from 57 to 71 inclusive or, preferably, yttrium, neodymium and gadolinium or, more preferably, neodymium and gadolinium. These rare earth elements can be used either singly or as a combination of two kinds or more according to need. The content of the rare earth element in the aluminum-based ahoy is in the range from 0.05 to 10 atomic % or, preferably, from 0.05 to 3 atomic %.

When the reflecting layer in a magneto-optical recording medium is formed from such an aluminum-based alloy, the thermal conductivity of the reflecting layer can be remarkably decreased as compared with a layer of pure aluminum without substantial decrease in the reflectivity so that the magneto-optical recording medium can be imparted with a remarkably increased recording sensitivity which can be adjusted as desired by suitably selecting the content of the rare earth element in the aluminum-based alloy. The reflecting layer of such an aluminum-based alloy can be formed conveniently by the method of sputtering using an alloy of aluminum and the rare earth element of a specified composition as the target.

It is not always necessary that the content of the rare earth element is uniform throughout the whole area of the reflecting layer. For example, it is sometimes advantageous to have the content of the rare earth element in the alloy gradually increasing from the area near to the center of the disc toward the peripheral area so that the thermal conductivity of the reflecting layer is higher in the peripheral area than at the center to balance the larger linear scanning velocity of the laser beam in the peripheral area. Similar effects can be obtained by decreasing the thickness of the reflecting layer toward the peripheral area to accelerate temperature increase.

In the following, examples are given to illustrate the invention in more detail.

Example 1

A glass plate having a thickness of 1.2 mm as a substrate was provided thereon, by the sputtering method, with a reflecting layer of a binary alloy of aluminum and neodymium or gadolinium having a thickness of 200 nm as a reflecting layer, of which the content of the rare earth element was varied within a range of up to 15 atomic %.

Figure 1A:
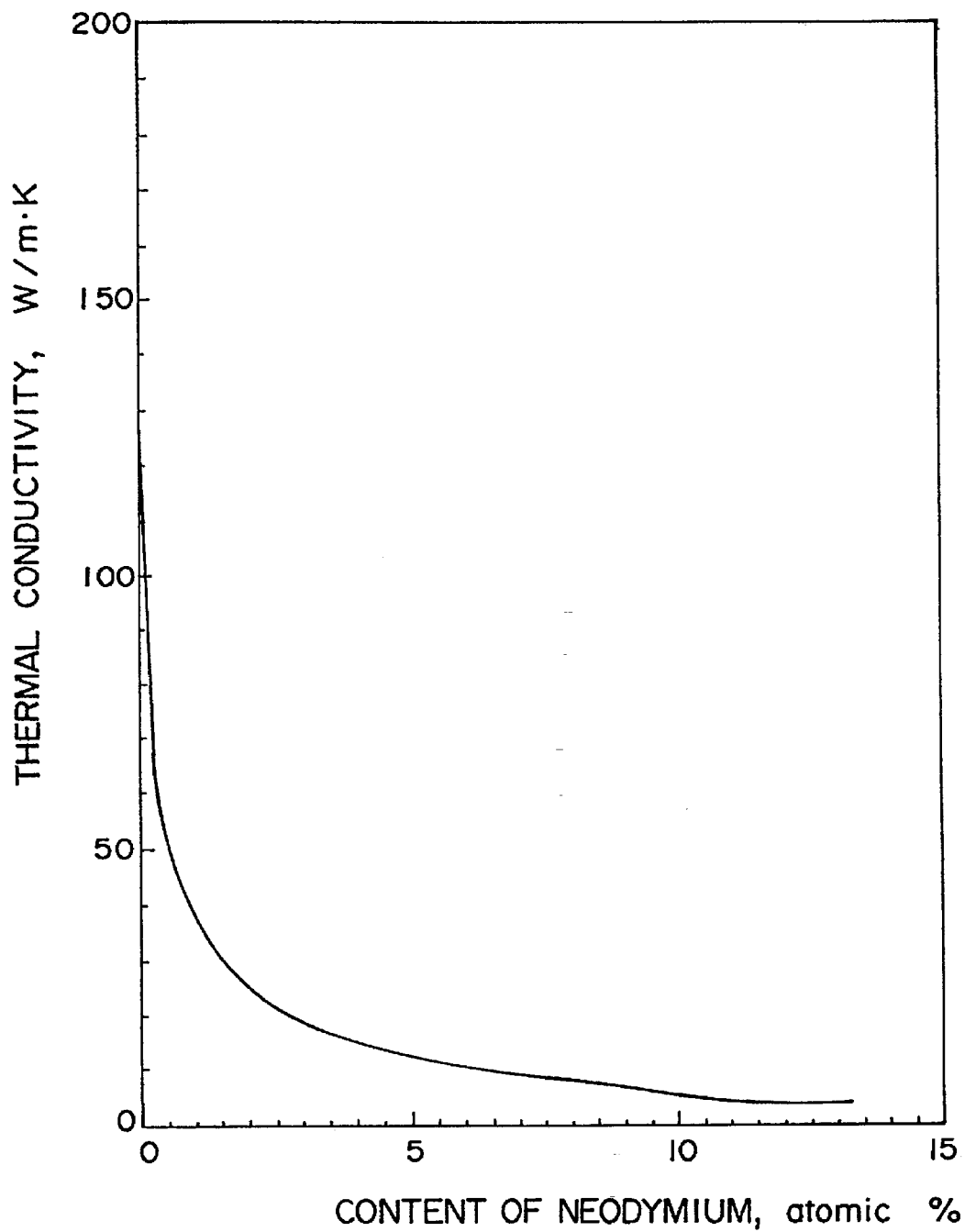
FIGS. 1a and 1b are each a graph showing the thermal conductivity of an alloy of aluminum and neodymium or gadolinium, respectively, as a function of the content of the rare earth element in the alloy.
Figure 1B:
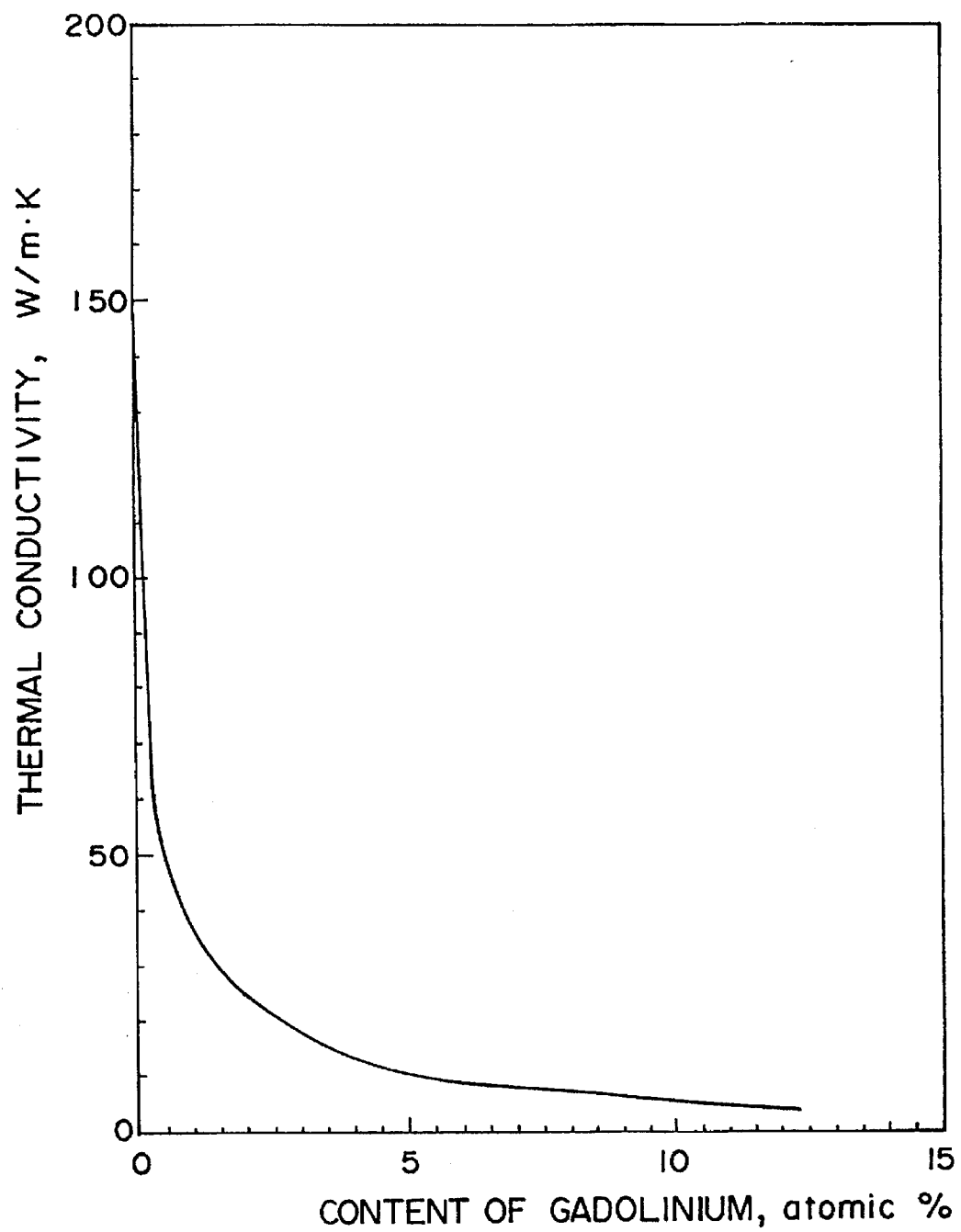
Figure 2A:
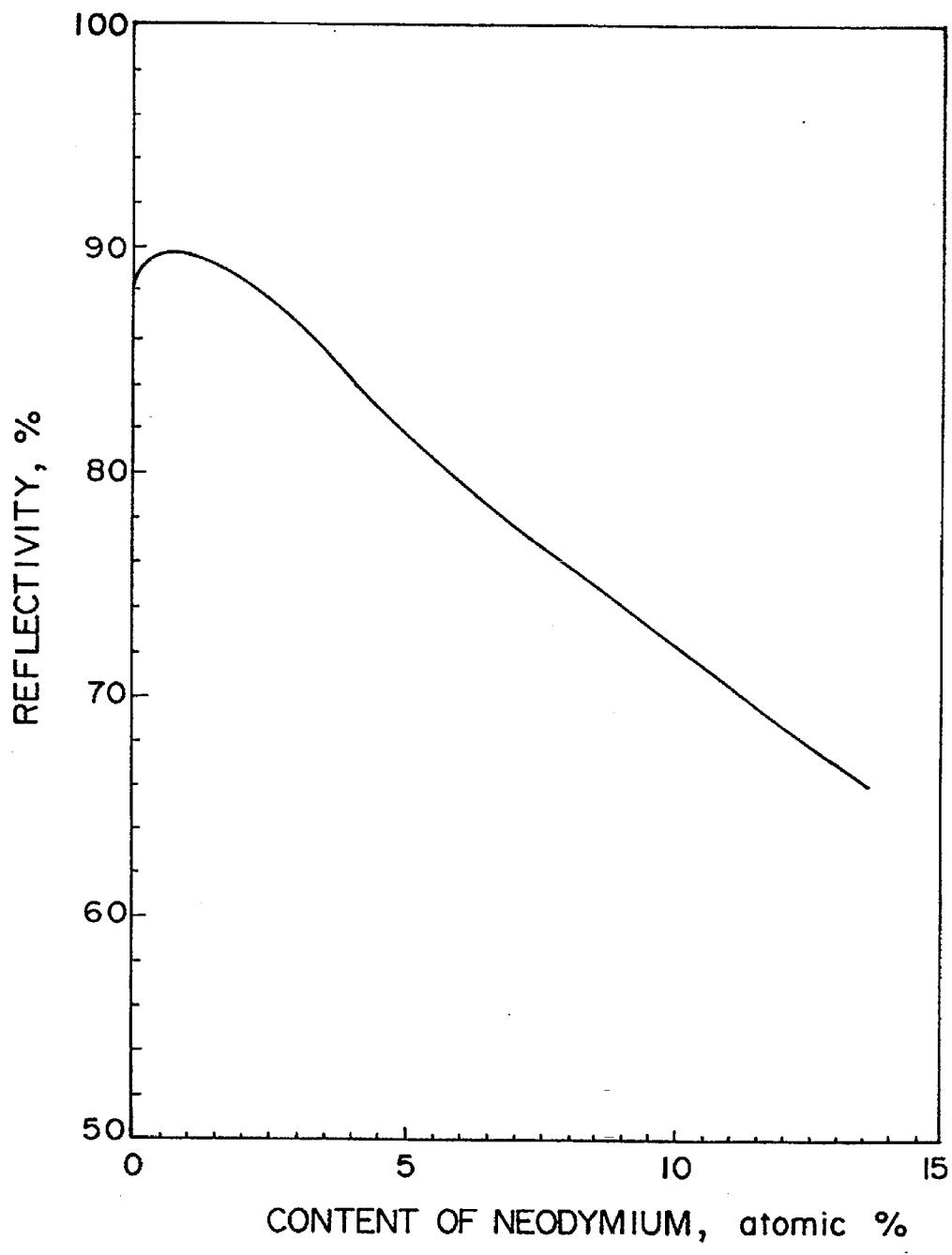
FIGS. 2a and 2b are each a graph showing the reflectivity of an alloy of aluminum and neodymium or gadolinium, respectively, as a function of the content of the rare earth element in the alloy.
Figure 2B:
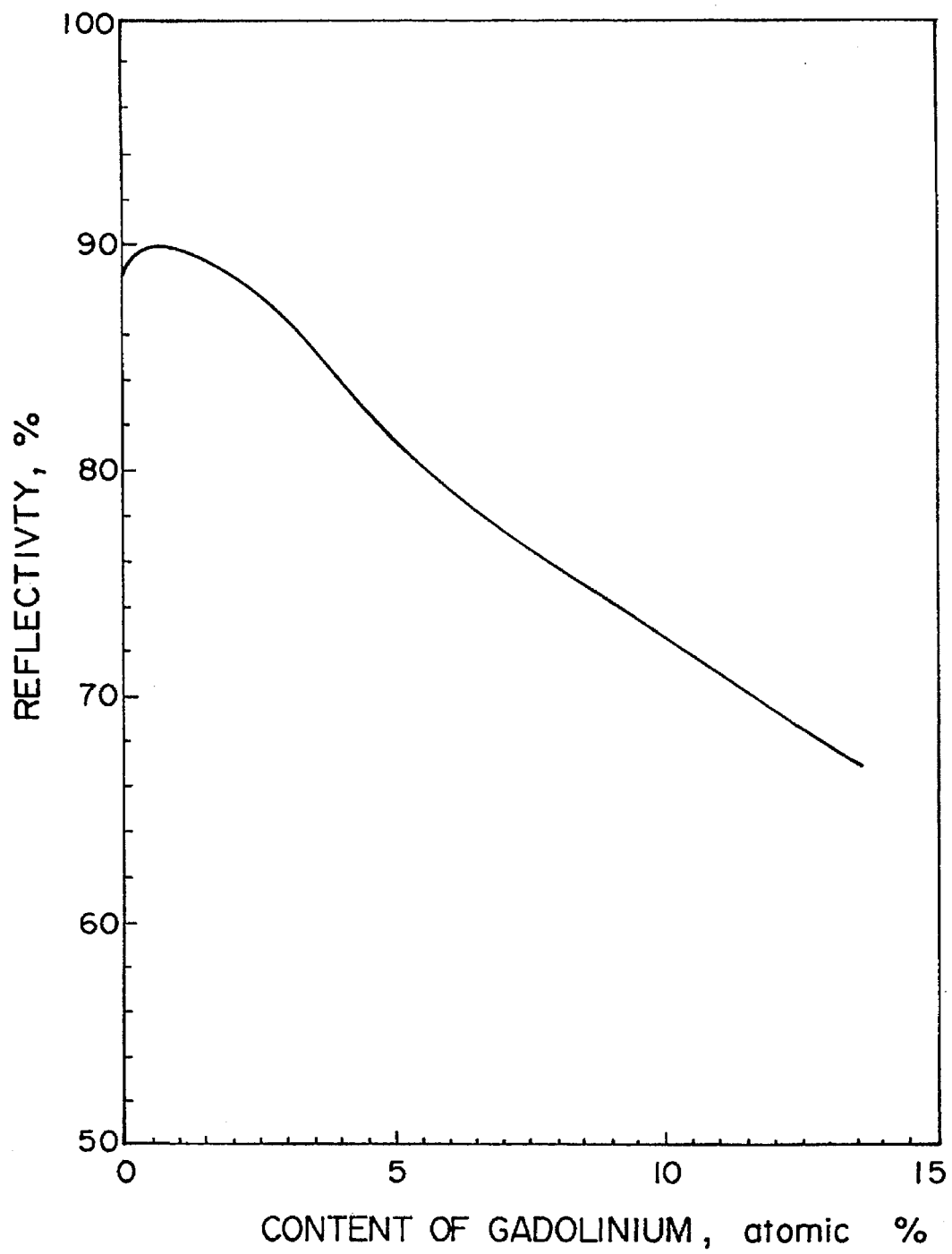
Figure 3A:
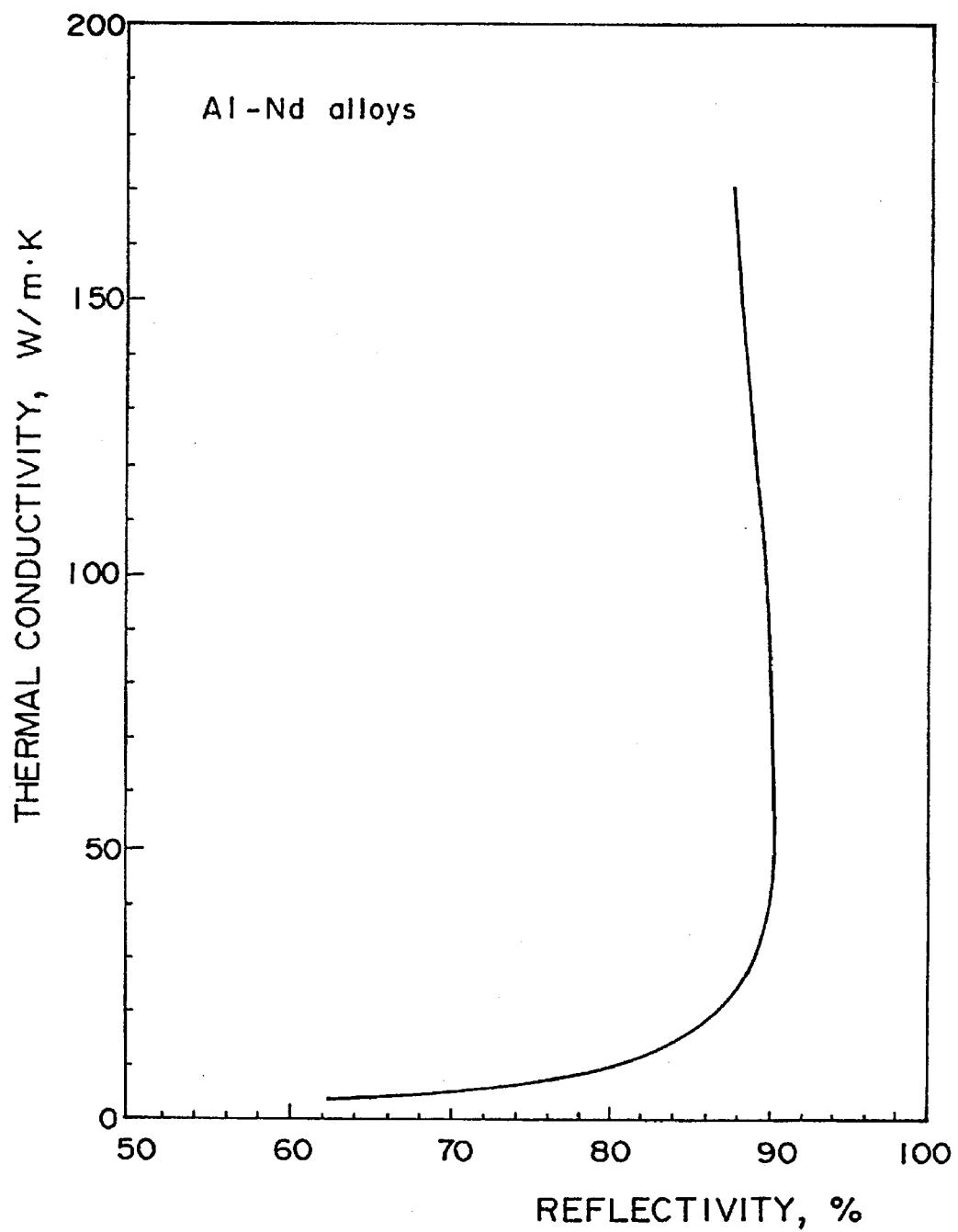
FIGS. 3a and 3b are each a graph showing the relationship between the reflectivity and thermal conductivity of the aluminum-neodymium and aluminum-gadolinium alloys, respectively, prepared in Example 1.
Figure 3B:
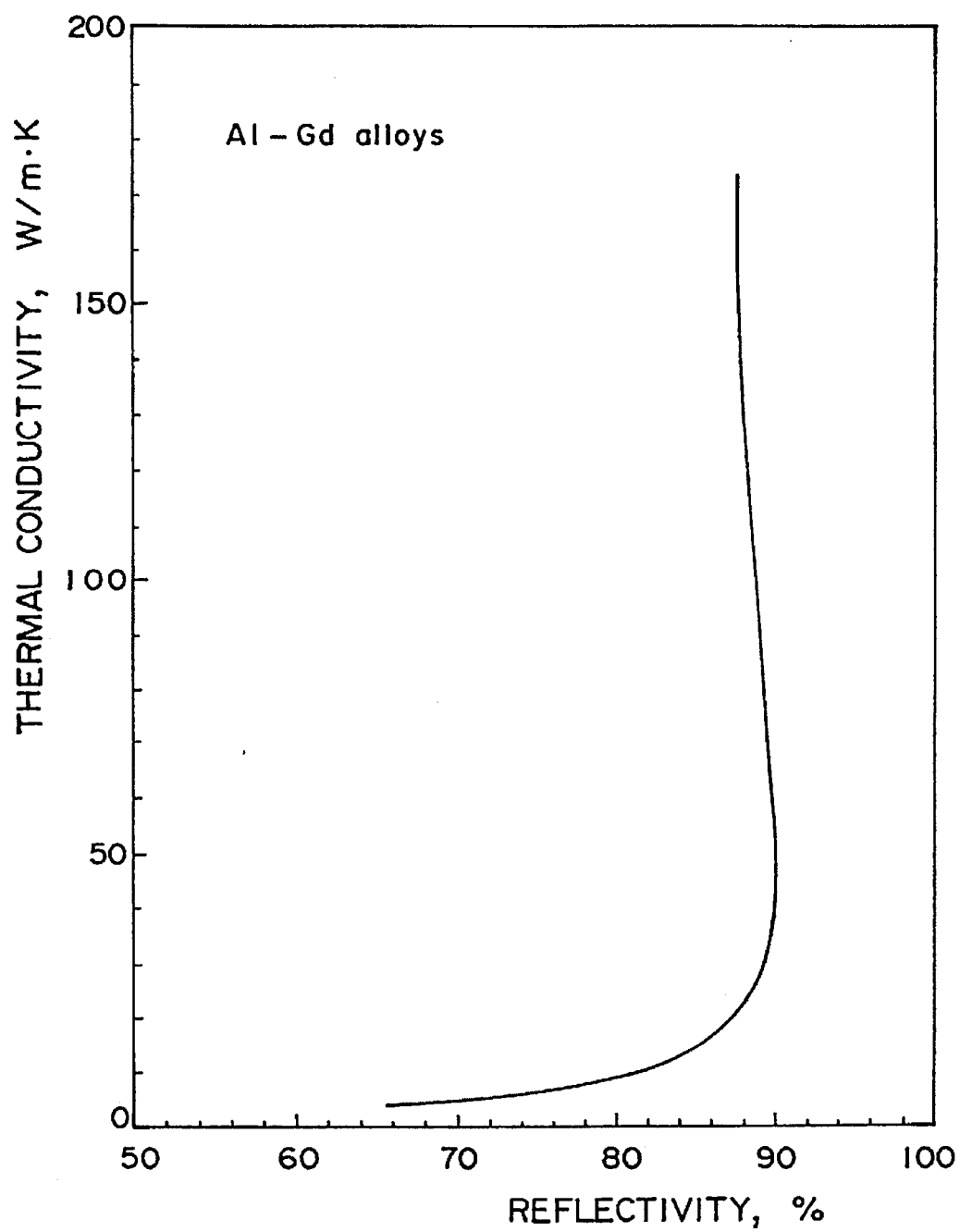

Measurements were made of the thermal conductivity and the reflectivity at a wavelength of 780 nm of the reflecting layer. The thermal conductivity was determined by applying the Wiedemann-Frantz's law to the sheet resistance of the layer measured at room temperature. The results are shown in FIGS. 1a and 1b and FIGS. 2a and 2b, respectively, of which FIGS. 1a and 2a are for the aluminum-neodymium alloys and FIGS. 1b and 2b are for the aluminum-gadolinium alloys, as a function of the content of the rare earth element in the binary alloy. FIGS. 3a and 3b are each a graph showing the relationship between the thermal conductivity and the reflectivity of the aluminum-neodymium and aluminum-gadolinium alloys, respectively. As is understood from these results, the thermal conductivity of the reflecting layer can be significantly decreased not to exceed 100 W/m·K when the content of the rare earth element in the alloy is only 0.05 atomic % or larger as compared with the layer fromed from pure aluminum. A conclusion derived from FIGS. 2a and 2b is that the reflectivity of the reflecting layer is greatly decreased when the content of the rare earth element in the binary alloy exceeds 10 atomic %. Further, FIGS. 3a and 3b indicate that the thermal conductivity of the layer can be greatly decreased without substantially affecting the reflectivity by suitably selecting the content of the rare earth element in the binary alloy.

Example 2

A magneto-optical recording medium was prepared by successively forming, on a plate of a polycarbonate resin having a thickness of 1.2 mm and provided with a guide groove for tracking as a substrate, by the sputtering method, layers including a layer of silicon nitride having a thickness of 30 nm as a first dielectric layer, a layer of a terbium-iron-cobalt alloy having a thickness of 16 nm as a recording layer, a layer of silicon nitride having a thickness of 30 nm as a second dielectric layer and a layer of a binary alloy of 99 atomic % of aluminum and 1 atomic % of neodymium or gadolinium having a thickness of 40 nm as a reflecting layer.

Figure 4A:
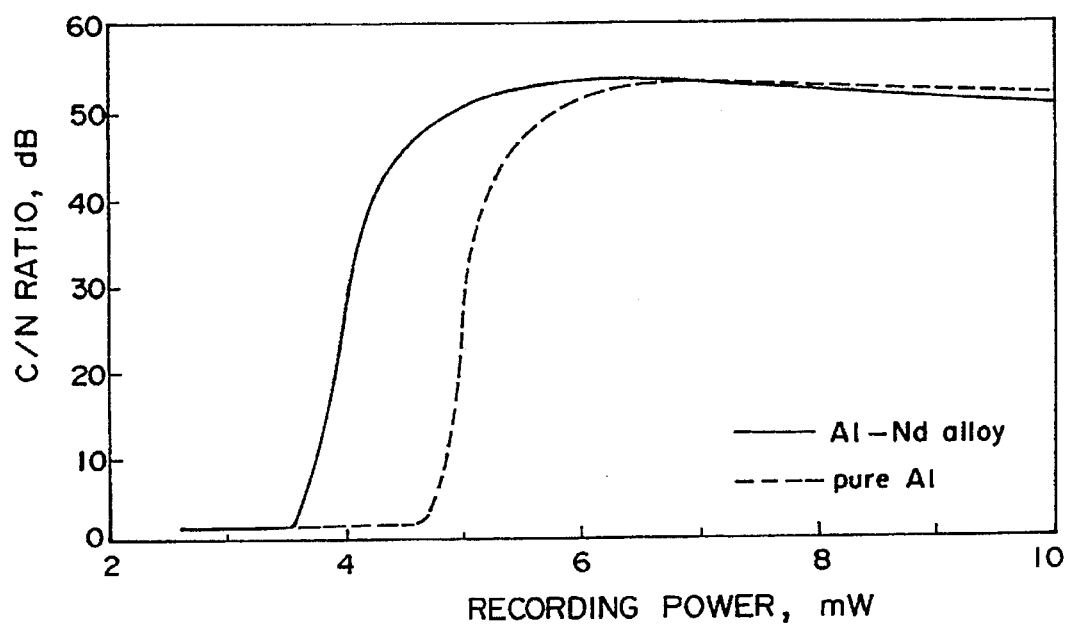
FIGS. 4a and 4b are each a graph showing the relationship between the recording power and the C/N ratio in the magneto-optical recording media having a reflecting layer of an aluminum-neodymium alloy and aluminum-gadolinium alloy, respectively, prepared in Example 2.
Figure 4B:
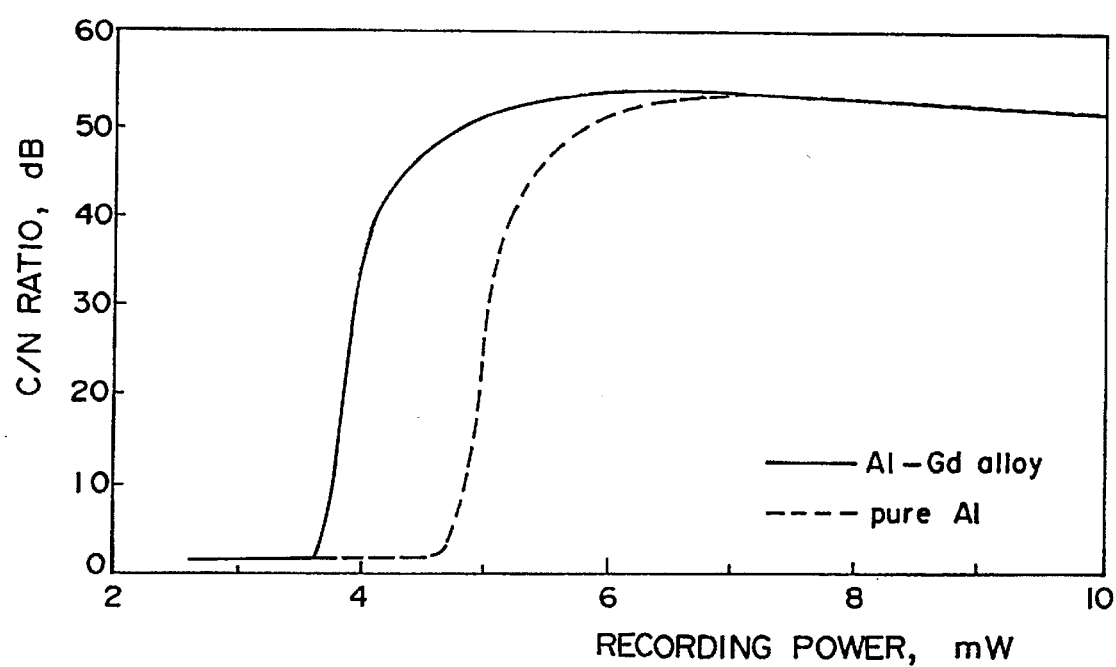

The magneto-optical recording medium was subjected to the measurement of the recording sensitivity at a distance of 39.9 mm from the center under the conditions of 2400 rpm of revolution, 45.8% of duty, 3.9 MHz of frequency and 1.5 mW of reading-out power. The results were as shown in FIGS. 4a and 4b for the aluminum-neodymium and aluminum-gadolinium alloys, respectively, which give the C/N ratio as a function of the recording power by the solid line. FIGS. 4a and 4b also give the results obtained with another magneto-optical recording medium prepared for comparative purpose by forming the reflecting layer from pure aluminum by the broken line.

What is claimed is:

1. In a magneto-optical recording medium having a laminar structure comprising a transparent substrate plate and a magnetic recording layer and a metallic reflecting layer formed on the substrate plate, the improvement which comprises having the reflecting layer formed from an alloy consisting of aluminum and a rare-earth element selected from the group consisting of yttrium, neodymium and gadolinium, the amount of rare-earth element being from 0.05 to 3 atomic %.

2. The improvement as claimed in claim 1 in which the rare earth element is neodymium or gadolinium.

* * * * *